L. H. W. SCHRAMM.
SIGNAL FOR MOTOR VEHICLES.
APPLICATION FILED JULY 8, 1915.
1,208,219.
Patented Dec. 12, 1916.
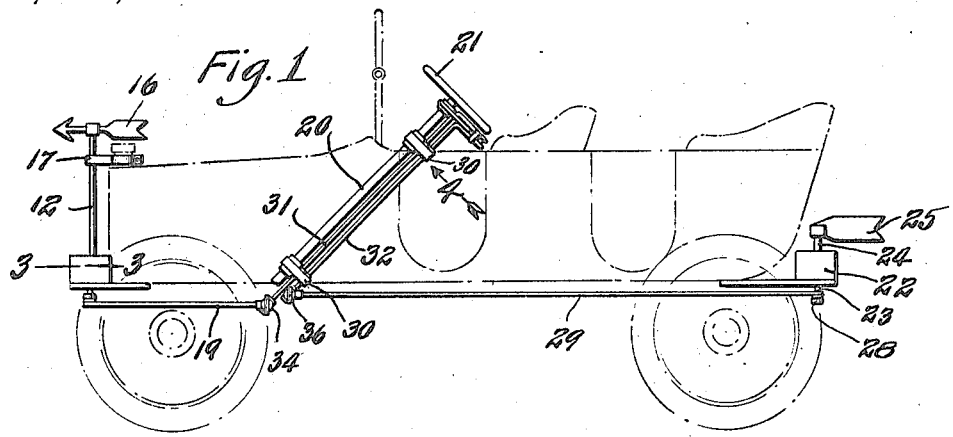
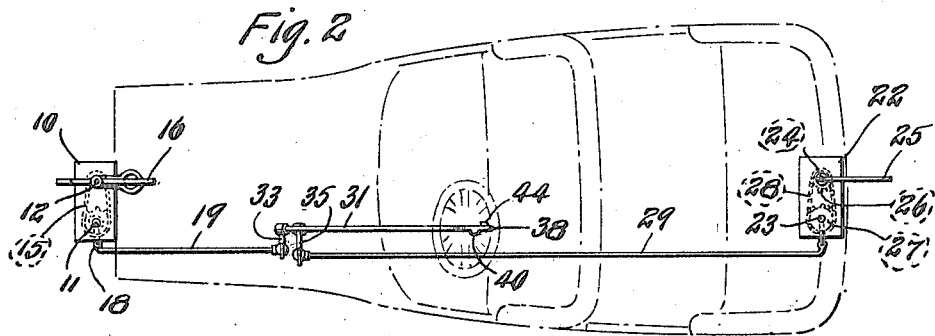
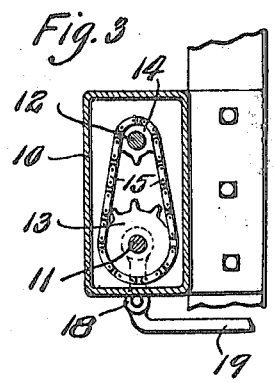
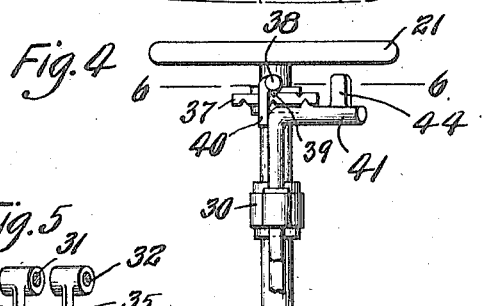
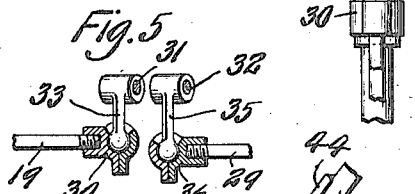
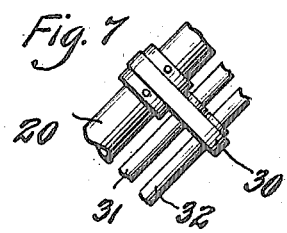
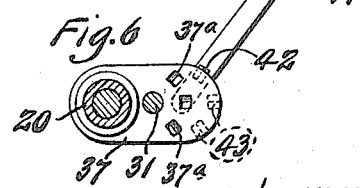
Inventor
Lawrence H. W. Schramm

UNITED STATES PATENT OFFICE.

LAWRENCE H. W. SCHRAMM, OF ST. LOUIS, MISSOURI.

SIGNAL FOR MOTOR-VEHICLES.

1,208,219.  Specification of Letters Patent.  Patented Dec. 12, 1916.

Application filed July 8, 1915. Serial No. 38,691.

*To all whom it may concern:*

Be it known that I, LAWRENCE H. W. SCHRAMM, a citizen of the United States, residing at St. Louis, Missouri, have invented a certain new and useful Improvement in Signals for Motor-Vehicles, of which the following is a full, clear, and exact description, such as will enable others skilled in the art to which it appertains to make and use the same, reference being had to the accompanying drawings, forming part of this specification.

My invention relates to a new and useful device in the nature of a direction indicator, said device being particularly adapted for use in connection with motor vehicles for the purpose of indicating to pedestrians as well as to approching or following vehicles the direction in which the driver of the vehicle to which the device is attached intends to turn; also to signal to the drivers of following vehicles the intention to slacken speed or to stop.

The principal object of my invention is to provide a comparatively simple, inexpensive signaling device which can be readily combined with ordinary motor vehicles and which device includes movable members arranged both at front and rear of the vehicle, said members being operated by means of connections which extend to the driver's seat and preferably at a point immediately adjacent to the steering wheel.

A further object of my invention is to provide a signaling device having indicators located at both front and rear of the vehicle, and which indicators can be simultaneously operated if desired, and the operating means being arranged so that the rear indicator can be operated independently of the front indicator, thus making it possible for the driver of a vehicle to signal to following vehicles his intention of turning or slackening speed without operating the front signal or indicator.

With the foregoing and other objects in view, my invention consists in certain novel features of construction and arrangement of parts, hereinafter more fully described, claimed and illustrated in the accompanying drawings, in which—

Figure 1 is a side elevational view of a motor vehicle, the same being shown in dotted lines and with my improved signaling device in position thereupon. Fig. 2 is a plan view of a motor vehicle, the same being shown in dotted lines and with my improved signaling device in position thereupon. Fig. 3 is a horizontal section taken approximately on the line 3—3 of Fig. 1. Fig. 4 is an elevational view of the upper portion of the steering post of a vehicle, and showing the operating handles or levers of my improved device applied thereto, said view being taken looking in the direction indicated by the arrow 4 in Fig. 1. Fig. 5 is an elevational view partly in section of ball and socket joints between parts of the operating mechanism of my improved device. Fig. 6 is a horizontal section taken approximately on the line 6—6 of Fig. 4. Fig. 7 is a side elevational view of a bearing which is carried by the steering post of the vehicle and which bearing supports a pair of rock shafts forming a part of the operating mechanism of the signal.

Referring by numerals to the accompanying drawings, 10 designates a box or housing which is arranged at a suitable point on the front of a vehicle preferably below the radiator thereof and mounted for rotary movement in suitable bearings in said box are vertically disposed shafts 11 and 12. Shaft 11 carries a comparatively large sprocket wheel 13 and shaft 12 carries a comparatively small sprocket wheel 14, said wheels being connected by a sprocket chain 15. Shaft 12 is extended upward to a suitable point above the radiator, and fixed to its upper end is an indicator 16, preferably in the form of an arrow. The upper portion of shaft 12 is journaled in a suitable bracket 17, which latter extends forwardly from the upper portion of the radiator. Shaft 11 extends through the bottom of box 10 and is provided with a fixed crank arm 18 to the outer end of which is pivotally connected the forward end of a rod 19, the same extending lengthwise beneath the body of the vehicle and terminating at a point near the lower end of the steering post. It will be understood that the steering post operates in the usual manner within the tubular housing 20, and said post carries on its upper end the usual steering wheel 21.

Carried by the rear portion of the vehicle body and preferably centrally arranged thereupon is a box 22 which is a counterpart of box 10 and journaled in said box are vertically disposed shafts 23 and 24, the latter being extended a short distance above said box and carrying at its upper end a small arm or flag-shaped indicator 25. Shaft 24 carries a comparatively small sprocket wheel 26 and shaft 23 carries a comparatively large sprocket wheel 27, said wheels being connected by a sprocket chain 28. Shaft 23 extends below and carries a fixed crank arm 28, to the outer end of which is pivotally connected the rear end of a rod 29, the same extending forwardly beneath the body of the vehicle and terminating at a point adjacent to the lower portion of the steering post sleeve.

Fixed on the steering post sleeve 20 at points near its upper and lower ends are downwardly projecting blocks 30 and journaled therein are rock shafts 31 and 32. A crank arm 33 is fixed to and extends laterally from the lower end of rock shaft 31, and the outer end of this crank arm is connected for universal movement by means of a ball and socket joint 34 to the rear end of rod 19. The lower end of rock shaft 32 is provided with a laterally projecting crank arm 35, the outer end of which is connected by means of a ball and socket joint 36 to the forward end of rod 29.

Fixed to the upper end of the steering post sleeve 20 immediately beneath the steering wheel 21 is a depending plate 37 in which the upper end of rock shaft 31 is journaled and fixed to the upper end of said rock shaft and overlying this plate is a handle 38, the same being provided with a depending lug 39 which is adapted to engage in notches 37ª, the same being formed in the top of said plate 37, thus maintaining the arm and rock shaft in their shifted positions.

Formed on the central portion of arm 38 is a depending finger 40. Fixed to the upper end of rock shaft 32 and extending downward immediately beneath plate 37 is an arm 41, the same being provided with an upwardly projecting lug 42, which is adapted to engage in notches 43 formed in the underside of plate 37 and which construction provides for the holding of the arm 41 and rock shaft 32 in their shifted positions.

Fixed to the central portion of arm 41 is an upwardly projecting finger 44 which, when said arm is swung to the left hand, past the central point or neutral position, engages arm 38 to move the same toward the left hand and likewise, when arm 38 is moved to the right past neutral position, depending finger 40 engages arm 41 and moves the latter toward the right.

The operation of my improved signaling device is as follows: When the driver of the vehicle to which my improved device is applied is about to turn toward the right hand and desires to signal adjacent pedestrians and vehicles, handle 41 is engaged and moved toward the left hand, it being understood that when handles 38 and 41 are at a central or neutral position on plate 37, the indicator 16 points directly forward and indicator 25 projects directly rearward. As handle is thus shifted toward the left hand, it will engage against finger 40 and finger 44 will engage against arm 38 and as a result, the latter is moved toward the left hand, and consequently both rock shafts 31 and 32 are correspondingly partially rotated. This movement swings the crank arms 33 and 35 upwardly and forwardly owing to the inclination of said rock shafts, and as a result, rods 19 and 29 are correspondingly moved forward a short distance. This movement imparted to crank arms 18 and 28 partially rotates shafts 11 and 23 carrying sprocket wheels 13 and 27, and this movement is transmitted by means of the sprocket chains 15 and 28 to the small sprocket wheels 14 and 26, thus partially rotating shafts 12 and 24, and as a result, indicator 16 is swung toward the right hand and simultaneously indicator 25 is swung toward the left hand after the manner of the rudder of a ship. Thus, the indicators at both ends of the vehicle are shifted into position so that pedestrians and drivers of vehicles adjacent to the car carrying the signaling device are aware of the direction in which the driver intends to turn. In the event that the driver desires to turn to the left, arm or handle 38 is engaged and moved toward the right hand, thereby moving the various connections in directions reverse to those as just described, and as a result, the indicator 16 will be turned toward the left hand when indicator 25 will be turned toward the right hand, thus giving the proper direction signal.

It will be understood that in shifting the arms or handles 38 and 41 from one position to another that the lugs 39 and 42 will ride into and out of the various notches in the plate 37, thus yieldingly holding the operating parts in their shifted positions.

In the event that the driver desires to manipulate the rear signal 25 only to indicate that he is about to slacken speed or turn, handle 41 is engaged and moved toward the right hand independently of the handle 38 and through the various connections controlled by said handle 41 and rock shaft 32, indicator 25 will be moved from a central position toward the right hand, thereby giving a warning signal to the driver of a following vehicle. Inasmuch as the handle 41 in this instance is moved away from handle 38, the latter and the signal 16 controlled thereby will not be actuated when the signal 25 is actuated as just described.

A signaling device of my improved construction is comparatively simple, can be easily and cheaply installed, can be readily combined with practically all forms of motor vehicles now in general use, and provides efficient and easily operated means for signaling the turning and stopping movements of a vehicle.

I claim:

1. The combination with a motor vehicle, of movable signal members arranged at front and rear of the body of the vehicle, operating connections extending from said signal members to the steering post of the vehicle, a pair of handles forming a part of the signal operating means, and means on each handle for engaging the other handle when either handle is moved toward the other, whereby both signaling members can be simultaneously operated.

2. The combination with a motor vehicle, of signaling members arranged for operation at front and rear of the vehicle body, independently operating actuating means for said signaling members, a portion of which means is located adjacent to the steering post of the vehicle, a handle for each actuating means, and a finger on each handle, which finger projects into the path of travel of the other handle so that when either handle is moved toward the other both handles will be moved simultaneously in the same direction.

3. The combination with a motor vehicle, of housings located at front and rear of the body of the vehicle, a pair of shafts journaled in each housing, a signaling member carried by one shaft of each pair, driving connections between the shafts of each pair, and means for actuating said driving connections, which actuating means includes a pair of handles arranged adjacent to the steering post of the vehicle and means on each handle for engaging the other handle when either handle is moved toward the other whereby both signaling members can be simultaneously operated.

4. The combination with a motor vehicle, of signaling members arranged for operation at front and rear of the vehicle body, independently operating actuating means for said signaling members, a portion of which means is located adjacent to the steering post of the vehicle, a handle for each actuating means, means on each handle for engaging the other handle when either handle is moved toward the other, whereby both signals are moved simultaneously and means for retaining said signals in their shifted positions.

In testimony whereof I hereunto affix my signature in the presence of two witnesses, this 29th day of June, 1915.

LAWRENCE H. W. SCHRAMM.

Witnesses:
M. P. SMITH,
W. A. HANDEL.